Dec. 20, 1960     W. D. PITTSLEY ET AL     2,965,404
SLOTTED BUMPER EXHAUST DEVICE

Filed Sept. 17, 1956     2 Sheets-Sheet 1

INVENTORS
William D. Pittsley, &
BY Harold H. Williams

L.D. Burk
ATTORNEY

Dec. 20, 1960   W. D. PITTSLEY ET AL   2,965,404
SLOTTED BUMPER EXHAUST DEVICE
Filed Sept. 17, 1956   2 Sheets-Sheet 2

INVENTORS
William D. Pittsley, &
BY Harold H. Williams

L. D. Burch
ATTORNEY

United States Patent Office 2,965,404
Patented Dec. 20, 1960

2,965,404
SLOTTED BUMPER EXHAUST DEVICE

William D. Pittsley, Flint, and Harold H. Williams, Davison, Mich., assignors to General Motors Corporation, Detroit, Mich., a corporation of Delaware Filed Sept. 17, 1956, Ser. No. 610,334

10 Claims. (Cl. 293—69)

This invention relates to bumper exhaust devices for motor vehicles and the like.

The invention provides a bumper exhaust device in which the exhaust gas from a motor driven vehicle is discharged from the exhaust pipe thereof directly into a slot extending across the bottom of a bumper employed on the vehicle in which stainless steel parts may be employed for preventing corrosion of the device by said exhaust gas and in which the entire structure may be assembled as a unit from the inside of the bumper.

In the drawing:

Figure 2 is taken substantially in the plane of line 2—2 of Figure 3 looking in the direction of the arrows thereon.

Figure 1:
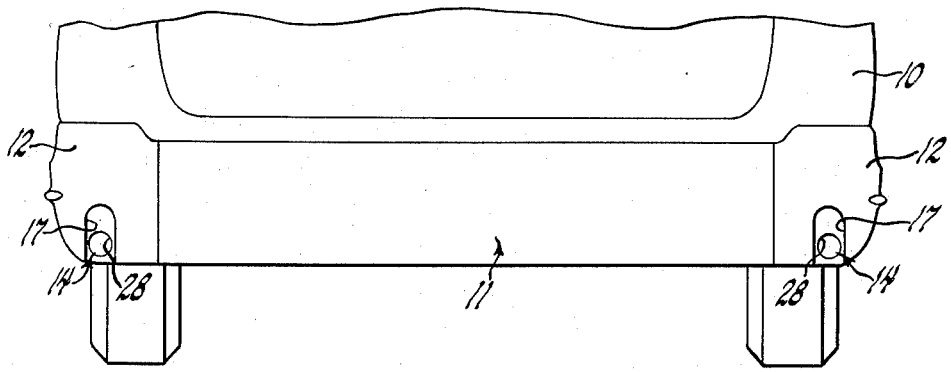
Figure 1 is a fragmentary rear end view of a motor vehicle having a bumper in the ends of which bumper exhaust devices embodying the invention are employed.
Figure 2:
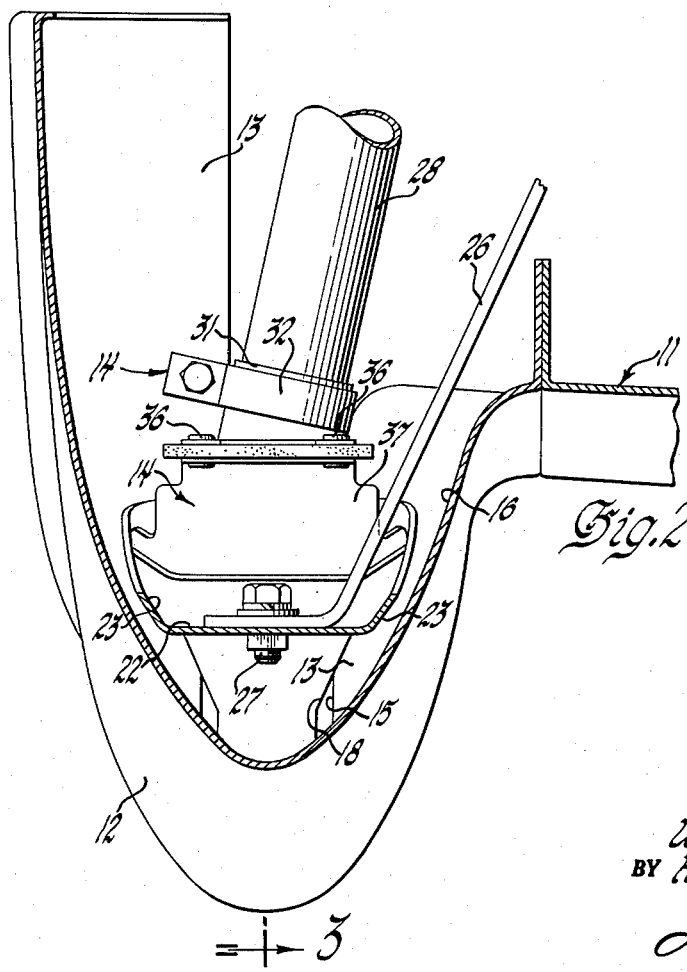
Figure 2 is a horizontal sectional view through one end of the bumper embodied in the motor vehicle disclosed by Figure 1.
Figure 3:
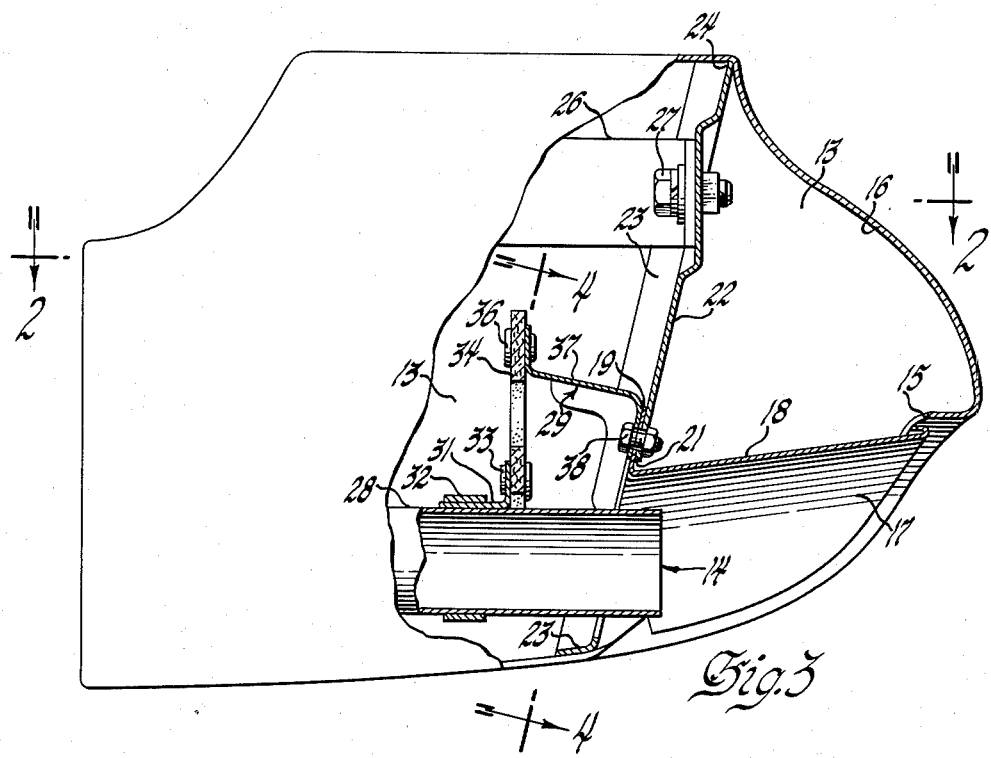
Figure 3 is an end view of the bumper disclosed by Figures 1 and 2 with parts thereof broken away and shown in section to better illustrate the bumper exhaust structure embodied therein.
Figure 4:
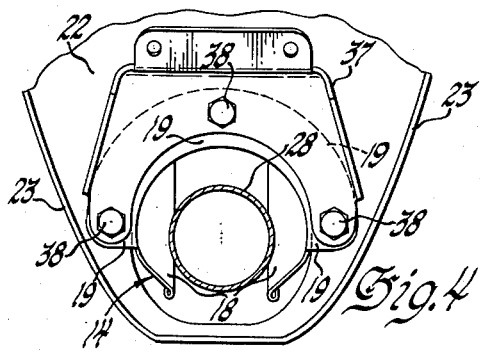
Figure 4 is a fragmentary front elevational view of the bumper exhaust structure embodied in Figures 2 and 3 with parts of the structure removed or illustrated in cross section, to better illustrate the supporting and assembling means embodied in the structure.

The motor vehicle 10 illustrated by Figure 1 has a rear bumper 11 in which impact members 12 are formed at the opposite ends thereof and which extend somewhat forwardly around the rear end of the vehicle, thereby providing interior cavities 13 in which bumper exhaust devices 14 may be installed. The impact members 12 are formed in bumper walls 16 embodied in the bumper 11, which may be shaped to provide the rearwardly and forwardly extending parts of the impact members 12 and the cavities 13 therein. The rearwardly extending parts of the impact members 12 are formed to provide slots 15 in which channels 17 open at the bottom and extend transversely across the lower parts of the impact members 12. The channels 17 may be formed by stainless steel shells 18 forming parts of the bumper wall 16 and extending into the slots 15 formed therein. The shells may be spaced at the rear and lower edges thereof from the remaining parts of the bumper wall 16. The shells 18 also may form removable parts of the bumper exhaust devices 14 and may be flanged at the forward ends as is indicated at 19. The flanges 19 are adapted to support the shells 18 within the upper parts of openings 21 formed in plates 22 adapted to be secured transversely across the rear ends of the cavities 13. It is considered preferable to have the shells 18 project rearwardly through the openings 21 so that the flanges 19 may be secured to the plates 22 from the inside of the bumper 11. The plates 22 are flanged at the sides and the lower ends thereof as is indicated at 23 to provide means whereby the plates may be welded or otherwise secured to the bumper wall 16. To properly locate the plates 22 so that they may be easily installed within the bumper wall 16, it may be desirable to provide locating notches 24 in the upper parts of the impact members 12 at each end of the bumper 11. The plates 22 and the flanges 23 may be so formed that when the upper edges of the plates are projected into the notches 24 the plates may be pivoted downwardly about the notches to fit the inside surfaces forming the cavities 13. When the plates are welded or otherwise secured in position the plates may be employed to support the impact members 12 upon brackets 26 secured to the plates by bolts 27. The brackets 26 may be suitably secured to the vehicle body or frame in any desired manner. The exhaust gas from the engine of the motor vehicle 11 may be discharged into the channels 17 by exhaust pipes or exhaust conduit means indicated at 28. The rear ends of the exhaust pipes 28 are adapted to be aligned with the channels 17 and the ends thereof to project into the channels above the open lower extremities of the channels so that any condensate in the exhaust pipes will fall by gravity therefrom without contact with any part of the bumper or bumper exhaust structure. The ends of the pipes 28 are adapted to be spaced within the openings 21 in the plates 22 and within the shells 18 and other parts of the bumper wall 16 to provide air flow passages around the rear ends of the pipes and to prevent contact between the ends of the pipes and any of the bumper structure. The pipes 28 are resiliently held in such position by supporting means indicated at 29. The supporting means 29 embodies flanged brackets 31 engaging the upper surfaces of the exhaust pipes 28 in front of the openings 21 in the plates 22. The brackets 31 may be secured to the pipes 28 by rings 32 surrounding the pipes and pressed over the ends of the brackets engaging the pipes. The flanged ends of the brackets may be secured by rivets or other suitable means 33 to the lower extremities of flexible, heat, vibration, sound, and other insulating means indicated at 34. The insulating means 34 may be formed of rubber and fabric tire carcass or other suitable material, if desired. The upper extremities of the insulating means 34 may be secured by rivets 36 or other suitable means to the ends of brackets 37 secured by bolts 38 to the plates 22. The brackets 37 may be secured to the rear surfaces of the flanges 19 formed on the shells 18 so that the structures may be assembled on the plates 22 by a single set of the bolts 38 for each bumper exhaust device.

It will be noted that the bumper exhaust devices 14 are simple and inexpensive and may be easily installed on any type of bumper structure. It is also to be noted that the slotted parts of the bumper wall 16 may be formed in each impact member or elsewhere in a bumper wall without employing expensive bumper manufacturing equipment. The slots 15 are merely the edges of metal sheets that may be bent and otherwise formed to provide the impact members 12. The flanged lower edges of the plates 22 extend across the slots in front of the rear ends of the exhaust pipes 28 and the flanged ends of the shells 18 to reinforce the impact members across the slots formed therein.

We claim:

1. A bumper exhaust structure for motor vehicles and the like and comprising a bumper having a bumper wall formed to provide an impact member, said impact member having an upwardly extending slot formed therein and providing a transversely disposed channel open at the bottom and extending rearwardly through said impact member, and exhaust conduit means having an end projecting into and aligned with said channel with said end terminating above the open bottom of said channel.

2. A bumper exhaust structure for motor vehicles and the like and comprising a bumper having a bumper wall formed to provide an upwardly extending slot therein, said bumper wall at said slot also being formed to provide a transversely disposed channel open at the bottom and extending rearwardly through said bumper, and exhaust conduit means having an end projecting into and aligned with said channel with said end terminating above the open bottom of said channel.

3. A bumper exhaust structure as defined by claim 2 and in which said end of said exhaust conduit means is supported in said channel in spaced relation to said bumper and said wall, thereby insulating said exhaust conduit means from said bumper and said wall with respect to vibration, sound, heat, etc.

4. A bumper exhaust structure for motor vehicles and the like and comprising a bumper having a bumper wall formed to provide an upwardly extending slot therein, said slot providing a channel open at the bottom and extending rearwardly through said bumper, exhaust conduit means having an end projecting into said channel with said end terminating above the open bottom of said channel, and insulating means supporting said exhaust conduit means in said channel in spaced relation to said bumper wall.

5. A bumper exhaust structure as defined by claim 4 and in which said insulating means is secured to and supported by said bumper.

6. A bumper exhaust structure for motor vehicles and the like and comprising a bumper having a bumper wall formed to provide an upwardly extending slot therein, said bumper wall at said slot also being formed to provide a transversely disposed channel open at the bottom and extending rearwardly through said bumper, a plate secured to said bumper wall and extending across the front of said channel and having an opening formed therein communicating with said channel, and exhaust conduit means having an end projecting through said opening and into and aligned with said channel with said end terminating above the open bottom of said channel.

7. A bumper exhaust structure as defined by claim 6 and in which said channel is formed in said wall by a stainless steel or other similar non-corrosive shell secured to said plate at said opening.

8. A bumper exhaust structure for motor vehicles and the like and comprising a bumper having a bumper wall formed to provide an upwardly extending slot therein, said slot providing a channel open at the bottom and extending rearwardly through said bumper, a plate secured to said bumper wall and extending across the front of said channel and having an opening formed therein communicating with said channel, a shell having a flange secured to the front of said plate and extending through said opening and forming said channel in said bumper wall, exhaust conduit means extending through said opening and having an end terminating above the open bottom of said channel, said end being disposed in spaced relation to said plate and said shell and within said opening, insulating means resiliently supporting said exhaust conduit means in said opening, and means for securing said insulating means and said shell to the front of said plate for assembly as a unit from within said bumper wall.

9. A bumper exhaust structure as defined by claim 8 and in which a notch is formed in said bumper wall for locating one end of said plate, whereby said plate may be readily secured in said wall with said opening in alignment with said slot and from the inside of said bumper.

10. A bumper exhaust structure as defined by claim 9 and in which said notch is formed in said wall at the forward end of an impact member formed at one end of said bumper and projecting rearwardly therefrom and in which said notch is formed and across which said plate extends.

References Cited in the file of this patent

UNITED STATES PATENTS

| | | |
|---|---|---|
| 2,515,391 | Arbib | July 18, 1950 |
| 2,568,409 | Phillips | Sept. 18, 1951 |
| 2,613,099 | Arbib | Oct. 7, 1952 |
| 2,818,932 | Deely-Jones | Jan. 7, 1958 |

FOREIGN PATENTS

| | | |
|---|---|---|
| 660,478 | Great Britain | Nov. 7, 1951 |